United States Patent [19]

Stich

[11] 4,050,006
[45] Sept. 20, 1977

[54] INVERTER HAVING CONSTANT FREQUENCY CHOPPER SYNCHRONIZED TO MODULATION FREQUENCY

[75] Inventor: Frederick A. Stich, Milwaukee, Wis.

[73] Assignee: Allis-Chalmers Corporation, Milwaukee, Wis.

[21] Appl. No.: 744,133

[22] Filed: Nov. 22, 1976

[51] Int. Cl.² ............................................. H02M 7/00
[52] U.S. Cl. ..................................... 363/98; 363/124; 363/132; 363/138
[58] Field of Search .......................... 321/5, 9 A, 2, 21

[56] References Cited

U.S. PATENT DOCUMENTS

| | | | |
|---|---|---|---|
| 3,781,641 | 12/1973 | Rettig | 321/21 |
| 3,848,176 | 11/1974 | Etter | 321/5 X |
| 3,986,100 | 10/1976 | Beierholm et al. | 321/2 X |

OTHER PUBLICATIONS

Electronics & Power, "Invertor Techniques for Power Supplies and A.C. Motor Control", J. R. Pashley, June, 1972, pp. 206–209.

*Primary Examiner*—William Shoop
*Attorney, Agent, or Firm*—Lee H. Kaiser

[57] ABSTRACT

A static inverter has a chopper transistor between a unidirectional source and the inverter load current carrying semiconductor switches, time ratio controlling means including a constant frequency oscillator for modulating the chopper at the constant oscillator frequency and for regulating the width of pulses conducted by the chopper as a function of the magnitude of an analog command signal, means for modulating the inverter semiconductor switches at a frequency which is a function of the analog command signal to establish the inverter output frequency, and means for synchronizing the switching of the chopper to the inverter output frequency so that the chopper is reset at the beginning of each half cycle of inverter output frequency.

10 Claims, 14 Drawing Figures

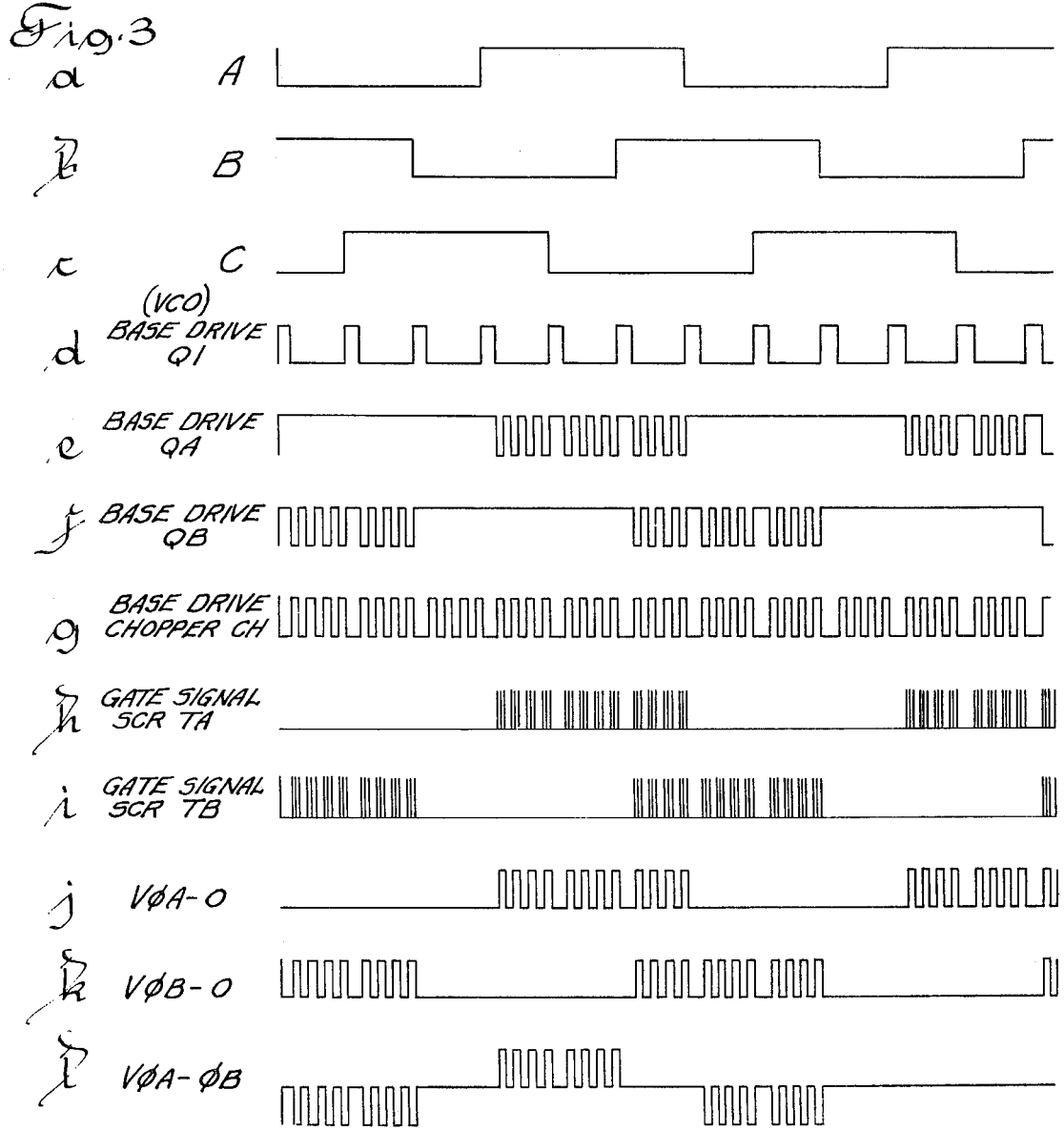

INVERTER HAVING CONSTANT FREQUENCY CHOPPER SYNCHRONIZED TO MODULATION FREQUENCY

This invention relates to static inverters for supplying variable frequency and variable magnitude voltage from a unidirectional source to a load such as an induction motor.

BACKGROUND OF THE INVENTION

Several different types of variable frequency, variable voltage power supplies having a transistor chopper are known, but they all have singular disadvantages. Variable voltage inverters having a transistor chopper require an LC filter between the chopper and the inverter semiconductor switches in order to reduce motor current ripple and effect a stable system. Variable ratio, synchronized carrier, pulse width modulated (PWM) inverters having a chopper are known wherein the carrier steps through a sequence of ratios, or modulation modes, as motor frequency is varied. However, material transitions in motor performance occur as such variable ratio, synchronized carrier inverters step from one ratio to another, and further such inverters necessitate a complicated and elaborate control. PWM inverters having a transistor chopper are also known wherein each modulation frequency half cycle contains a fixed number of PWN chopper pulses regardless of motor speed, but the chopping frequency is so low at very low motor speeds, e.g., at 2 Hz, in such inverters that ripple occurs in the motor current and also chopping frequency is so high at high motor speeds that excessive dissipation occurs in the chopping element.

OBJECTS OF THE INVENTION

It is an object of the invention to provide an improved chopper type PWM variable frequency, variable voltage power supply which obviates the above defects and disadvantages of the prior art devices. Another object is to provide such an improved chopper type PWM static inverter which has: (1) a relatively simple control circuit in comparison to prior art devices; (2) constant motor ripple frequency that is always within acceptable limits; and (3) a chopping frequency that does not vary with motor speed and does not result in excessive dissipation in the chopper. It is a more specific object of the invention to provide an improved static PWM chopper type inverter wherein the chopping frequency is constant and is synchronized to the modulation frequency so that beat frequencies are avoided, DC components and subharmonics are eliminated in the motor current, and chopping is identical in the positive and negative half cyles of modulation frequency.

SUMMARY OF THE INVENTION

A static inverter in accordance with the invention has transistor chopper means coupled in series respectively with at least first and second semiconductor switches across the positive and negative polarities of a unidirectional source; means including a constant frequency oscillator for time ratio controlling the chopper means at the constant frequency of the oscillator; means for modulating the semiconductor switches to establish the inverter output frequency; and means for synchronizing the switching of the chopper means to the inverter output frequency so that chopping is identical in the positive and negative half cycles of the inverter output waves. In a preferred embodiment, the constant frequency oscillator derives a train of generally triangular ramp pulses; the ramp pulses are compared to a steady state signal which is a function of the magnitude of an analog command signal to derive variable width, constant frequency pulses for modulating the chopper means; the semiconductor switch modulating means derives a train of modulation frequency controlling pulses whose frequency is a function of the analog command signal; a generator derives reference waves which are synchronized to the modulation frequency controlling pulses and modulate the semiconductor switches of the inverter; and the synchronizing means is responsive to each modulation frequency controlling pulse to set the output of the constant frequency oscillator to a predetermined value, whereby the succeeding chopper pulse is synchronized to the leading edge of the inverter output wave half cycle and chopping is identical in the positive and negative half cycle.

DESCRIPTION OF THE DRAWING

The above and other objects and advantages of the invention will be more readily apparent from the following detailed description when considered together with the accompanying drawing wherein:

FIGS. 3a –3l show wave forms at various points within the variable frequency, variable voltage power supply of the invention.

DETAILED DESCRIPTION

Figure 1:
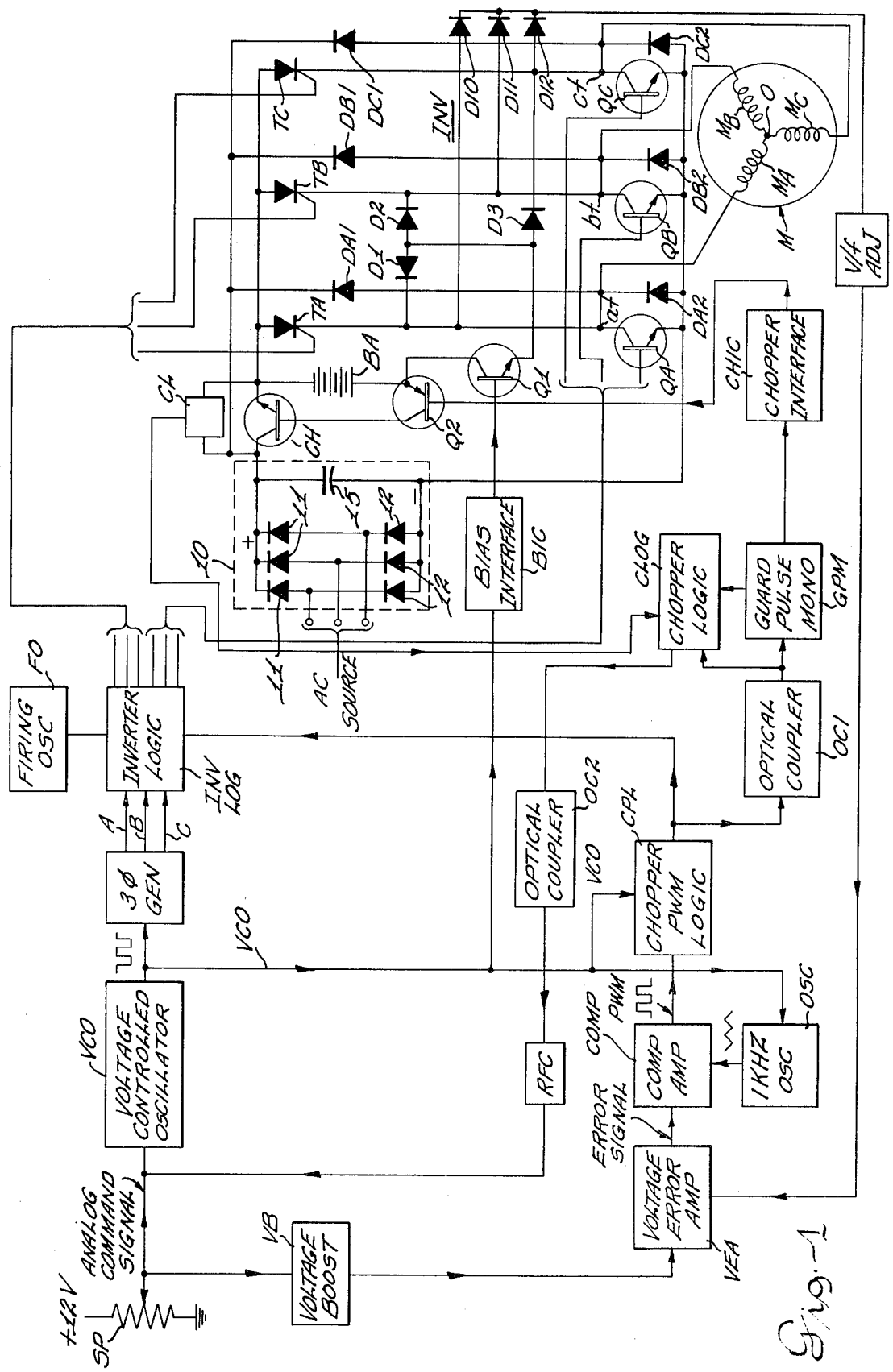
FIG. 1 is a schematic diagram of a preferred embodiment of the variable frequency, variable magnitude voltage supply of the invention with the control circuit shown in block form.

FIG. 1 is a schematic block diagram of a preferred embodiment of the invention adapted to provide variable frequency and variable voltage power from a unidirectional source 10 to a load such as an induction motor M to control motor speed over a wide range. Source 10 may supply 300 volt DC power through a voltage controlling transistor chopper CH to the inverter semiconductor switches and may in known manner comprise a three phase, full wave bridge rectifier having three diode rectifiers 11 with commoned cathodes connected to a positive bus + and three diode rectifiers 12 having commoned anodes connected to the negative bus − and a smoothing shunt capacitor 15. The inverter is shown as a series bridge INV which has three phase legs with a controlled rectifier, or SCR TA in the phase A leg having its anode coupled to the emitter of transistor chopper CH and in series with a transistor switch QA having its emitter coupled to the negative bus and the node therebetween constituting the phase A output terminal at adapted to be connected to phase winding $M_A$ of motor M; a controlled rectifier TB in series with a transistor switch QB in the phase B leg and the node therebetween constituting the phase B output terminal bt adapted to be connected to motor phase winding $M_B$; and a controlled rectifier TC in series with a transistor switch QC in the phase C leg and the node therebetween consituting the phase C output terminal ct adapted to be connected to motor phase winding $M_C$. Feedback diodes DA1, DB1, DC1 may be connected in inverse polarity shunt relationship with SCR's TA, TB, TC respectively between the corresponding phase terminals at, bt, ct and the positive bus +at the input to chopper transistor CH, and feedback diodes DA2, DB2, DC2 may similarly be connected in inverse polarity shunt relation to transistor switches QA, QB, QC respectively. A separate voltage source BA for forward biasing chopper CH and for reverse biasing SCR's TA, TB, TC is shown as a battery BA and may have its negative terminal referenced to the output of chopper CH and its positive terminal coupled to the collector of a bias-applying transistor Q1 whose emitter is coupled through diodes D1, D2, D3 respectively to the corresponding phase output terminals at, bt, ct. The positive terminal of source BA is also coupled to the emitter of a chopper driver transistor Q2.

SCR's TA, TB, TC are turned on sequentially by trains of gate pulses (See FIGS. 3h and 3i) as described hereinafter, and turning on transistor Q1 will apply bias source BA across the anode-cathode paths of SCR's TA, TB, TC to reverse bias them and commutate them off when chopper CH is turned off and they are only conducting low magnitude current. The reactive current paths through feedback diodes DA1, DB1, DC1 and also through feedback diodes DA2, DB2, DC2 are in inverse polarity to the unidirectional power source 10 so that reactive current flow therethrough does not interfere with commutation of SCR's TA, TB, TC. It will be noted that the disclosed arrangement commutates SCR's TA, TB, TC off while transistor chopper CH is turned off and only low magnitude current is flowing therethrough and thus eliminates the conventional means such as auxiliary thyristors and large and expensive commutation inductors and capacitors which are utilized in known force-commutated SCR inverters to commutate off the load current carrying switches.

Transistor switches QA, QB, QC are controlled to provide, in conjunction with the feedback diodes, out-of-phase, low impedance free-wheeling paths for reactive motor current during the off-time of SCR's TA, TB, TC. The transistor switches QA, QB, QC may be driven inexpensively because they have the common emitter potential of the negative bus, and such reactive motor current paths may be easily altered because of the inherent turn-off ability of transistor switches QA, QB, QC.

It will also be noted that this disclosed arrangement eliminates the expensive filter with energy storage required between chopper and inverter bridge of known variable voltage inverters to prevent transient conditions in the inverter bridge from interfering with the unidirectional source. As described hereinafter, chopper CH is switch at sufficiently high and constant frequency so that motor M can accomplish the filtering, and elimination of such conventional DC filter improves transient response for the inverter, while the constant high carrier frequency at which chopper CH is switched lowers motor ripple. Further, SCR's TA, TB, TC are switched at the relatively low fundamental, or motor frequency, and may thus be of inexpensive low-speed type.

A speed controlling potentiometer SP whose winding is connected across a voltage source +12V may be set by the operator to derive an analog command, or speed reference signal whose magnitude is proportional to desired speed of motor M. The command signal is both a speed reference and a voltage reference and controls both the fundamental modulation frequency of inverter INV and the width of PWM pulses which turn chopper CH on and off to vary the average voltage applied to motor M. As a speed reference, the analog command signal is coupled to a voltage controlled oscillator VC0 which, in known manner, generates a train of negative-going rectangular, modulation frequency controlling VC0 pulses whose frequency is proportional to the magnitude of the analog command signal. The VC0 pulses, after inversion in a logic gate G1 (see FIG. 3d), are coupled to a three phase generator 3φ GEN which may in known manner comprise a shift register and in response thereto generates three phase reference square waves A, B, C (see FIGS. 3a, 3b, 3c) displaced 120° apart at a frequency which is 1/6 that of said VC0 pulses and which establish the fundamental inverter output frequency. The reference waves A, B, C are associated with and given the same reference designations as the corresponding phase legs of the inverter bridge INV and control the switching of SCR's TA, TB, TC respectively, as described hereinafter, and the leading and trailing edges of the reference waves A, B, C occur in synchronism with the VC0 pulses.

The VC0 pulses occur at six times modulation frequency (i.e., six times the frequency of reference waves A, B, C) and form commutation signals (FIG. 3d) which turn bias applying transistor Q1 on to connect source BA in reverse polarity to, and thus commutate off, SCR's TA, TB, TC when chopper CH is off during each VC0 commutation signal pulse. The VC0 pulses are coupled through a bias interface circuit BIC to the base of bias-applying transistor Q1 and turn it on to connect the positive terminal of bias source BA through diodes D1, D2, D3 to the cathodes of SCR's TA, TB, TC and commutate them off.

As a voltage reference the analog command signal is coupled to a voltage boost circuit VB which modifies the command signal to allow selective variation of the volts/hertz curve for low frequency and thus compensate for changes in flux density in motor M with variation in inverter output frequency.

The modified analog command speed signal from VB is applied to a voltage error amplifier VEA that also receives a feedback signal which is a sample of, and proportional to, the average voltage at the motor terminals at, bt, ct. Voltage error amplifier VEA compares the analog signal to the sample voltage feedback signal and derives a unidirectional error signal proportional to their difference. The feedback signal is coupled to voltage error amplifier VEA through a V/f ADJ network which permits selective adjustment of the ratio of feedback voltage to speed reference voltage.

A constant frequency oscillator OSC derives a train of generally triangular sawtooth, or ramp pulses at a relatively high carrier frequency, which may be one kilohertz, that establishes the carrier frequency rate of chopping by transistor chopper CH. The constant frequency oscillator OSC also receives the VC0 commutation signals as an input to synchronize the chopping frequency to the fundamental output frequency of the inverter by resetting the output of OSC to a predetermined value in response to each VC0 pulse. Such phase locking of the one kilohertz oscillator and motor frequency assures that chopping is identical in both half cycles of inverter output frequency and thus avoids subharmonics and DC components in the motor current. The error signal from VEA and the train of constant frequency ramp pulses from OSc are inputs to a comparator COMP which compares them and in known manner derives an output train of variable width PWM rectangular pulses whose width is proportional to the magnitude of the error signal.

A chopper PWM logic network CPL receives the VC0 commutation signal pulses and the variable width PWM pulses as inputs and superimposes the VC0 pulses on the PWM chopper pulses for the purpose of blanking chopper CH during commutation of SCR's TA, TB, TC, i.e. during the commutation interval when the VC0 commutation signal pulses turn on bias applying transistor Q1 to thereby reverse bias and commutate off the SCR's.

The PWM pulses having commutation signal notches superimposed thereon from network CPL (shown in FIG. 3g as "base drive chopper CH") are applied to an inverter logic network INV LOG which also receives as inputs the modulation frequency reference square waves A, B, C and the high frequency gating pulses from a firing oscillator F0 whose output may be at 50 kilohertz. The inverter logic network INV LOG interfaces with the SCR's TA, TB, TC and also with transistor switches QA, QB, QC and combines the three inputs and derives therefrom gating signals for SCR's TA, TB, TC (see FIGS. 3h and 3i) and also derives base drive signals for transistor switches QA, QB, QC (see FIGS. 3e and 3f).

Figure 2:
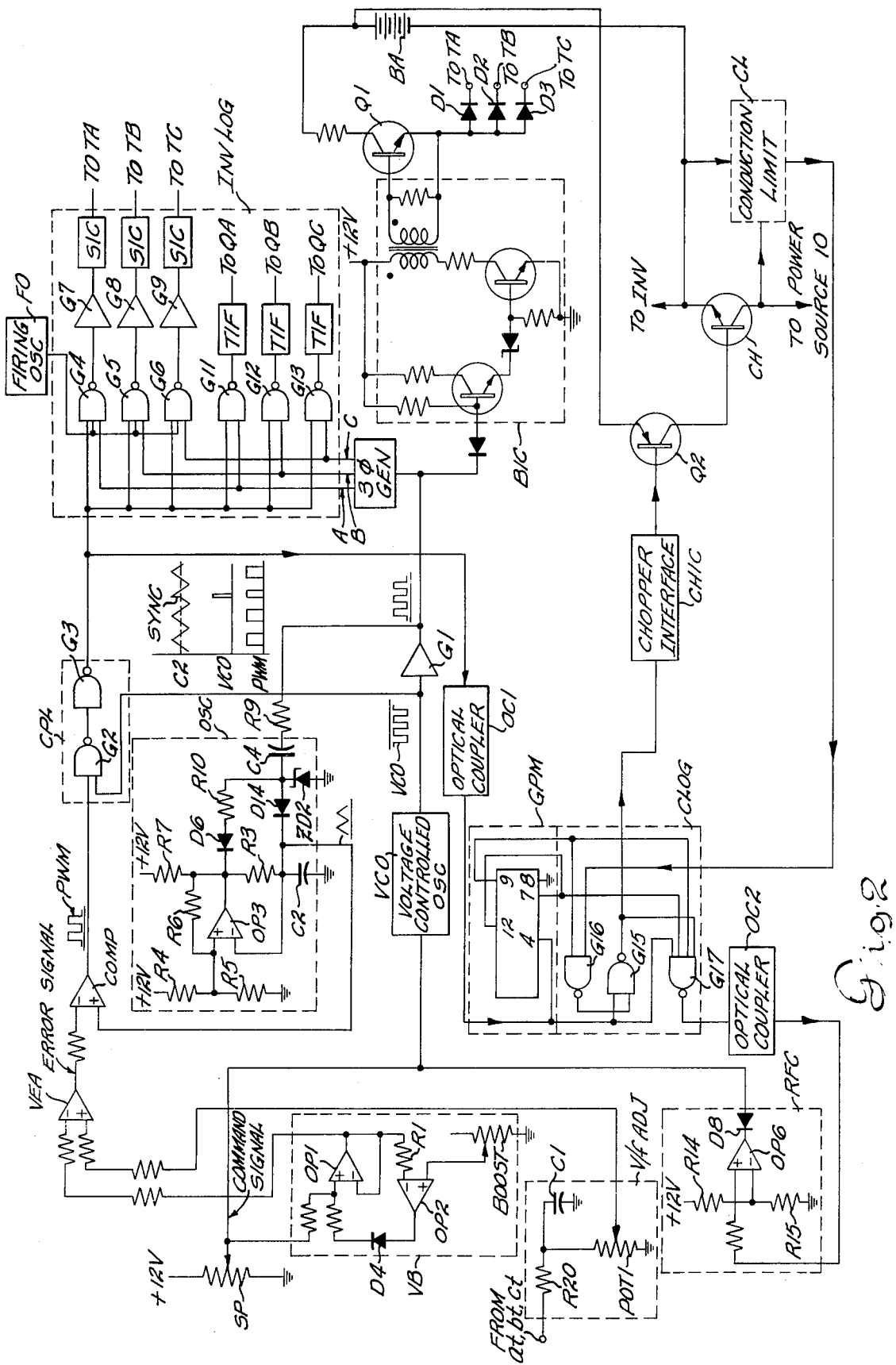
FIG. 2 is a schematic circuit diagram of the control circuit of FIG. 1.

Inverter logic network INV LOG applies 50 kilohertz firing signals to each thyristor TA, TB, TC during the corresponding reference wave A, B, C for the duration of each PWM pulse (which turns on CH) and removes firing signals therefrom during VC0 commutation signal pulses and also during the off intervals between the PWM pulses when CH is blanked. For example, gating pulses are applied to SCR TA when chopper CH is on and A is true and are removed when CH is off between PWM pulses and during the VC0 pulses. As shown in FIG. 2, network INV LOG includes three 3-input NAND gates G4, G5, G6 whose outputs are respectively coupled through NOT gates G7, G8, G9 to the gates of controlled rectifiers TA, TB, TC. Each gate G4, G5, G6 receives on one input 50 khz firing pulses from F0 and on a second input the variable width PWM pulses from gate G3 having commutation notches superimposed thereon. On the third input gates G4, G5, G6 respectively receive reference waves A, B, C from 3ϕ GEN. The output of gate G4 goes to logical 0 when its three inputs are all logical 1, i.e., when (a) gate G3 goes to logical 1 (to turn on HC), and (b) A is true, and (c) F0 generates a firing pulse. The resulting logical 0 output of gate G4 is converted to logical 1 by NOT gate G7 whose output is coupled through a suitable SCR interface circuit SIC shown in block form to the gate of TA to fire it. Each thyristor TA, TB, TC is turned off when a commutation signal VCO pulse from gate G1 turns on bias-applying transistor Q1 to apply bias source BA in reverse polarity to the anode-cathode paths of TA, TB, TC to commutate them off (see FIGS. 3h and 3i). It will thus be appreciated that thyristors TA, TB, TC switch at relatively low frequency and may be of the low-speed type.

It will be appreciated that no expensive commutation components are required for SCR's TA, TB, TC and also that such low-speed SCR's without commutation components are less expensive than equivalent transistor switches. Further, the interface circuits to SCR's TA, TB, TC are much simpler and less expensive since low-cost transformers may be used rather than the interface circuits for transistors which require higher power, continuous, isolated drive signals.

Inverter logic circuit INV LOG also applies base drive turn-on pulses to transistor switches QA, QB, QC during (a) the respective reference waves A, B, C for the duration of the off period between PWM pulses when chopper CH is blanked (see FIGS. 3e and 3f), and (b) during the negation of the corresponding reference wave, e.g., QA is turned on during the $\overline{A}$ reference wave. Gates G11, G12, G13 receive as inputs the corresponding reference waves A, B, C respectively and also receive the positive-going PWM pulses having commutation notches from gate G3. The outputs of G11, G12, G13 are coupled to the bases of transistor switches QA, QB, QC respectively through suitable transistor interface circuits TIF shown in block form. When each reference wave is true, logical 0 from gate G3 in the off-period between positive-going PWM pulses provides logical 1 output from the corresponding gate G11, G12, G13 to turn on the corresponding transistor switch QA, QB, QC (e.g., logical 0 from G3 provides logical 1 from G11 to provide turn-on base drive to QA — see FIG. 3e). Similarly, during the inversion of each reference wave turn-on base drive is applied to the corresponding transistor switch QA, QB, QC. For example, during the $\overline{A}$ wave, the logical 0 input to G11 from 3ϕ GEN will provide a logical 1 output to turn on transistor switch QA. Transistor switches QA, QB, QC thus operate in a manner analogous to an OR gate in that either: (a) they are turned on to provide low impedance, free-wheeling paths for reactive motor current when chopper CH is turned off during the corresponding reference wave, or (b) they are turned on when the inversion of the corresponding reference wave is true, e.g., QA is turned on during $\overline{A}$, to provide paths for power pulses to the motor as well as free-wheeling paths.

The transistor switches QA, QB, QC are located in the negative bus where they may be inexpensively driven since they have a common emitter potential and are turned on sequentially for 180° intervals to provide, together with the feedback diodes, low impedance, free-wheeling paths for reactive motor current when thyristors TA, TB, TC are turned off. Such free-wheeling paths may be easily altered because of the inherent turnoff capability of the transistor switches. All three transistor switches QA, QB, QC are turned on when chopper CH is off.

When chopper transistor CH is driven, its emitter may swing between zero volts and 300 volts, and consequently isolation of chopper CH by optical isolator couplers OC1 and OC2 is desirable to drive chopper CH efficiently. It will be appreciated that an inverter with a transistor chopper can operate at the relatively high frequency of oscillator OSC which eliminates the need for an LC filter at the input to the chopper and also provides excellent dynamic response which is usually only characteristic of PWM inverters.

The PWM pulses with commutation signal notches from gate G3 of CPL are coupled through an optical isolator coupler OC1 to a guard pulse monostable multivibrator GPM and also to a chopper logic circuit CLOG which is connected through a chopper interface circuit CHIC (shown in block form) to the base of chopper driver transistor Q2 (shown in skeleton schematic form). The PWM pulses trigger a first monostable multivibrator in GPM to its astable state wherein it holds CLOG in its existing state to prevent turning on chopper CH for a time delay. When the first multivibrator in GPM times out, it triggers CLOG to (a) apply the PWM pulse to chopper driver Q2 to turn on chopper CH, and (b) triggers a second multivibrator in GPM to its astable state to prevent CLOG from responding to the conduction limit circuit (CL) output for the duration of a "guard pulse," thereby assuring that the chopper CH will remain on for the duration of the guard pulse, i.e., for the period of the second multivibrator. The period of the second multivibrator in GPM is less than the time interval that chopper transistor CH can safely remain out of saturation without damage and established the width of the guard pulse during which CH is turned on. Chopper transistor CH should saturate during the guard pulse and will conduct during the remainder of the PWM pulse if it does turn on. The collector-to-emitter potential $V_{CE}$ of chopper transistor CH is sensed by conduction limit circuit CL (shown in block form) whose output is coupled to the chopper logic circuit CLOG. If chopper CH does not saturate during the guard pulse, the output of conduction limit circuit CL will actuate chopper logic circuit CLOG to remove the turn-on signal to chopper CH at the end of the guard pulse when the second multivibrator in GPM returns to its stable state, in the manner disclosed in my U.S. Pat. No. 3,855,520 having the same assignee as this invention. Further, if chopper transistor CH pulls out of saturation at any time after the guard pulse, conduction limit circuit CL will sense its increased $V_{CE}$ potential and trigger CLOG to remove the turn-on signal from the chopper. The chopper logic circuit CLOG will also respond to the output of conduction limit circuit CL when the chopper CH is not following the PWM control pulses and, through an optical isolator OC2, trigger a "reduce frequency" circit RFC whose output is coupled to the input of voltage controlled oscillator VCO and subtracts from the magnitude of the analog command signal so that the inverter modulation frequency is reduced. This permits the inverter INV to increase motor speed relatively slowly instead of in a single step.

CONTROL CIRCUIT DETAILS

Voltage Boost

The analog command signal from potentiometer SP can be selectively modified by voltage boost circuit VB to raise or lower the low frequency portion of the motor terminal voltage versus motor frequency characteristic in a direction to provide a voltage boost at low motor speed and thus compensate for decrease in magnitude of motor current and in motor torque that would occur at low frequencies in the absence of such voltage boost. Circuit VB, in effect, senses when the level of the analog command signal is above or below a predetermined value and adds a voltage to the analog signal at low motor speeds when the analog signal is below such predetermined magnitude. The analog command signal is coupled to the noninverting input of an operational amplifier OP1. OP1 merely repeates this analog command signal since it has a feedback loop which gives it a multiplication factor of unity. The output of OP1 is coupled through a resistance R1 to the inverting input of a comparator operational amplifier OP2 which receives on its noninverting input a fixed voltage reference signal from the slider of a BOOST potentiometer. The output of OP2 is coupled through a diode D4 to the noninverting input of OP1. Amplifier OP2 compares its two inputs, and when the analog command signal is less than the fixed reference signal set on the BOOST potentiometer, OP2 adds a voltage to the noninverting input of unity gain amplifier OP1 which brings its output voltage up to the level of the breakpoint in the voltage-frequency characteristic. It will be appreciated that the BOOST potentiometer permits selective variation of the level of the low motor speed portion of the motor terminal voltage versus frequency characteristic.

Voltage Reference

The voltages at motor terminals at, bt, ct are fed back through diodes D10, D11, D12, which provide an OR function, and through a resistance R20 to the V/f ADJ network comprising an "average" filter including a capacitance C1 to provide a measure of average motor terminal voltage which is impressed across a potentiometer POT 1 having one side grounded. A sample of the average motor terminal voltage available at the slider of POT 1 is applied to the noninverting input of voltage error amplifier VEA which receives on its inverting input the analog command signal as modified by voltage boost circuit VB.

One Kilohertz Oscillator

One kilohertz oscillator OSC derives generally triangular ramp, or sawtooth pulses across a capacitor C2 which are applied to the noninverting input of comparator amplifier COMP. Oscillator OSC includes an operational amplifier OP3 whose output is coupled through a charging resistance R3 to capacitor C2 and whose inverting input is coupled to C2. The noninverting input of OP3 is coupled to a voltage divider including resistances R4 and R5 connected in series between voltage source +12V and ground. Such voltage divider also includes a positive feedback resistance R6 between the output and noninverting input of OP3 and a resistance R7 connecting one side of R3 to the +12V source.

Capacitor C2 is charged through R3 and R7 from the +12V source until the voltage across C2 is equal to the voltage set on the noninverting input of OP3 by voltage divider R4, R5, R6, R7. OP3 then switches to the low state, and the resulting low output voltage from OP3 is positively fed back through R6 to its noninverting input which assumes a lower potential. C2 then discharges through R3 until the capacitor voltage again equals the potential on the noninverting input of OP3, which now switches to the high state, and the cycle repeats. The voltage across capacitor C2 is a generally triangular ramp signal which is applied to the noninverting input of comparator amplifier COMP.

Each negative-going pulse from voltage controlled amplifier VCO is inverted by a NOT logic gate G1 whose output is a phase synchronizing signal to oscillator OSC and is coupled to capacitor C2 through a differentiating circuit comprising a resistance R9 and a capacitance C4. Each positive-going VCO pulse from gate G1 is converted by differentiating circuit C4, R9 to a spike synchronizing pulse SYNC which is coupled through a diode D14 to capacitor C2 and raises the capacitor voltage to the predetermined value which causes OP3 to switch to the low state. Zener diode ZD2 limits the peak magnitude of the spike pulse. This brings the phase of the one kilohertz oscillator OSC and the voltage controlled oscillator OSC into synchronism. Such phase locking of VCO and one kilohertz pulses avoids beat frequencies between such pulses and assures that chopper CH is reset at the beginning of each cycle of inverter fundamental output frequency, that chopping is identical in both half cycles of inverter fundamental output frequency, and that harmonics are constant and subharmonics are of low magnitude in the motor current.

Inverters embodying this invention having means to synchronize chopping frequency to modulation frequency are also disclosed in my co-pending application Ser. No. 744,131 filed Nov. 22, 1976 and in co-pending application in the names of F. A. Stich and T. P. Gilmore, Ser. No. 735,609 filed Oct. 26, 1976 both having the same assignee as this invention.

Comparator Amplifier

Comparator operational amplifier COMP receives the unidirectional analog error signal on its inverting input and the one kilohertz ramp pulses on its noninverting input. COMP compares that two inputs and changes to the high state to derive in known manner the leading edge of a variable width PWM pulse when the leading edge of the ramp signal exceeds the error signal, and it forms the trailing edge of the PWM pulse when the ramp signal trailing edge again crosses the level of the error signal.

Chopper PWM Logic

The chopper PWM logic CPL includes A NAND logic gate G2 which receives as inputs the variable width positive-going PWM pulses from COMP and the negative-going VCO commutation signal pulses and superimposes commutation notches on the PWM pulses.

Chopper Interface

The positive-going PWM pulses from gate G3 are applied through optical oscillator OC1 to (a) one input of a NAND logic gate G15 of circuit CLOG, and (b) input pin 4 of guard pulse monostable multivibrator GPM shown as an integrated circuit such as the type MC-14528 commercially available from Motorola Corporation and embodying two monostable multivibrators. Gate G15 does not change its logical 1 output at this time since it has a logical 0 on its other input from a gate G16 (which is receiving logical 1 inputs from pin 9 of GPM and from the conduction limit circuit CL). The logical 1 PWM pulse from G3 triggers the first GPM multivibrator to the astable state so that it provides logical 0 on its $\overline{Q}$ output pin 7 which is coupled to input pin 12 of the second monostable multivibrator, thereby holding $\overline{Q}$ output pin 9 of the second multivibrator at logical 1 for the period of the first multivibrator, preventing change of gate G16, and delaying the turning on of the chopper CH for the period of the first multivibrator.

Pin 7 goes to logical 1 when the first multivibrator times out, thereby applying logical 1 to pin 12 to trigger the second multivibrator to its astable state and provide logical O on the $\overline{Q}$ output pin 9. Logical O on pin 9 converts the output of gate G16 to logical 1 which changes the output of gate G15 to logical O to turn on chopper driver transistor Q2 which then conducts to apply forward bias from the positive terminal of source BA to the base of chopper transistor CH.

The chopper interface circuit CHIC is shown only in block form and the separate voltage source BA referenced to the emitter of CH is illustrated as a battery.

The period of the second multivibrator in GPM establishes the width of the "guard pulse" during which chopper transistor CH should turn on at the beginning of each PWM pulse. The logical O on pin 9 of GPM holds the output of gate G15 at logical 0 so that chopper logic CLOG cannot respond to the conduction circuit as long as the second monostable is in the astable state. The "guard pulse" period of the second multivibrator in GPM is shorter than the time interval chopper transistor CH can safely be out of saturation without damage. Chopper transistor CH should saturate and provide logical 0 output from conduction limit circuit CL during the guard pulse period of the second monostable multivibrator in GPM, and if CH does go into saturation, the logical 0 from CL will prevent change of the logical 1 output from gate G15 when the second multivibrator in GPM times out. However, if chopper transistor CH pulls out of saturation during the guard pulse, conduction limit circuit CL will provide a logic 1 output to gate G16, in the manner disclosed in my U.S. Pat. No. 3,855,520, to convert its output to logical 0 when the second multivibrator times out and provides logical 1 on pin 9, thereby converting the output of G15 to logical 1 to turn off the chopper.

If chopper transistor CH pulls out of saturation at any time after the guard pulse, conduction limit circuit CL will provide logical 1 output to logic gate G16, thereby changing its output to logical 0. The logical 0 from gate G16 will provide logical 1 output from gate G15 to turn off the chopper. The logical 1 from gate G15 will also provide a logical 0 output from 4-input NAND gate G17 which is coupled through optical coupler OC2 to the noninverting input of an operational amplifier OP6 in the reduce frequency circuit RFC and switches it to the low state. Amplifier OP6 receives a positive voltage on its inverting input from a voltage divider R14, R15, and the output of OP6 is coupled through a diode D8 to the input of oscillator VCO. When OP6 switches to the low state, diode D8 conducts and sustracts from the analog command signal input to oscillator VCO and thereby causes oscillator VCO to reduce the frequency of its modulation frequency controlling pulses. This reduces motor frequency and permits inverter INV to increase motor speed slowly instead of in a single step or to reduce speed in the event of a sudden increase in shaft load.

Conduction Limit

Conduction limit circuit CL is coupled to chopper logic circuit CLOG and provides a logical 0 signal thereto when chopper CH is in saturation and a logical 1 signal at all other times. Stated in another manner, the output of conduction limit circuit CL follows the $V_{CE}$ voltage of chopper CH and is logical 0 and logical 1 respectively when transistor CH is respectively in and out of saturation.

Conduction limit circuit CL for chopper CH protects SCR's TA, TB, TC and also transistor switches QA, QB, QC since limiting the current that chopper CH can carry also limits the current that the SCR's and transistor switches can carry.

It will be appreciated that the disclosed inverter arrangement provides high frequency-PWM, variable magnitude voltage to a motor load using only a single chopper switch whose carrier frequency is sufficiently high so that the motor can do the filtering and no DC filter is required for the chopper.

FIGS. 3j and 3k illustrate the fundamental frequency phase-to-neutral voltages for inverter phases A and B respectively and FIG. 31 shows the resultant phase-to-phase voltage having positive and negative half cycles.

While only a single embodiment of my invention has been illustrate and described, many modifications and variations thereof will be readily apparent to those skilled in the art, and consequently it should be understood that I do not intend to be limited to the particular embodiment shown and described.

The embodiment of the invention in which an exclusive property or privilege is claimed are defined as follows:

1. A variable frequency, variable voltage power supply comprising, in combination, a static inverter adapted to be coupled to a unidirectional electric power source and including a plurality of load current carrying semiconductor switches, semiconductor chopper means in one polarity of said source between said source and said semiconductor switches without a filter between said chopper means and said switches, means for modulating said semiconductor switches at a selectively variable frequency to establish the output frequency of said inverter, means including a carrier constant frequency oscillator for time ratio controlling said chopper means at the carrier frequency of said oscillator, said carrier constant frequency being independent of said inverter output frequency and sufficiently high to permit elimination of a filter between said chopper means and said semiconductor switches, and means for synchronizing the switching of said chopper means to said inverter output frequency so that chopping is identical in the positive and negative half cycles of the inverter output waves.

2. A variable frequency, variable voltage power supply in accordance with claim 1 wherein said inverter has n legs with a controlled rectifier semiconductor switch in each leg, and said modulating means sequentially applies gating signals to said controlled rectifier switches to control the direction of current flow through a load supplied from the inverter output.

3. A variable frequency, variable voltage power supply in accordance with claim 1 wherein said modulating means includes voltage controlled oscillator means for deriving a train of modulation frequency controlling pulses whose frequency is a function of an analog command signal, said carrier constant frequency oscillator generates a train of generally triangular ramp pulses, and said means for synchronizing is responsive to said modulation frequency controlling pulses to set the output of said constant frequency oscillator to a predetermined voltage so that said chopper means is reset at the beginning of each half cycle of inverter output frequency.

4. A variable frequency, variable voltage supply in accordance with claim 3 wherein the signals for time ratio controlling said chopper means result from the interaction of said ramp pulses and a steady state signal whose magnitude is a function of said analog command signal.

5. A variable frequency, variable voltage supply in accordance with claim 4 wherein said modulating means includes means for generating a plurality of reference waves which are synchronized to said modulation frequency controlling pulses and each of which is associated with one leg of said inverter, the switching of said semiconductor switches of said inverter being controlled by said reference waves.

6. A variable frequency, variable voltage power supply in accordance with claim 5 wherein said inverter has n output phases and said reference wave generating means derives n phase reference waves displaced 360/n electrical degrees apart whose leading edges are synchronized to said modulation frequency controlling pulses and said phase reference waves are respectively associated with the inverter output phases and regulate the switching of the semiconductor switch in the associated inverter output phase.

7. A variable frequency, variable voltage supply comprising, in combination, an n-phase inverter adapted to be coupled to a unidirectional electric power source and having a load current carrying semiconductor switch in each output phase, chopper transistor means in one polarity of said source between said source and said semiconductor switches voltage controlled oscillator means for deriving a train of modulation frequency controlling pulses, an n-phase generator for deriving n phase reference waves displaced 360/n electrical degrees apart and synchronized to said modulation frequency controlling pulses and each of which is associated with one phase of said inverter, means for modulating said semiconductor switches in the respective phases of said inverter in accordance with the associated phase reference waves to establish the inverter fundamental output frequency, oscillator means for generating a train of carrier constant frequency, generally triangular ramp pulses, means for comparing said train of ramp pulses to a steady state signal to derive variable width signals at said carrier constant frequency, pulse width modulating means for switching said chopper transistor means in accordance with said variable width signals, said carrier constant frequency being independent of said modulation frequency and sufficiently high to permit elimination of a filter between said chopper transistor means and said semiconductor switches, and means for synchronizing the switching of said chopper transistor means to said phase reference waves so that said chopper transistor means is reset at the beginning of each half cycle of inverter fundamental output frequency and chopping is the same in the positive and negative half cycles of the inverter output waves.

8. A variable frequency, variable voltage supply in accordance with claim 7 wherein said means for synchronizing includes means responsive to said modulation frequency controlling pulses for setting the output of said ramp pulse generating oscillator means to a predetermined voltage.

9. A variable frequency, variable voltage supply in accordance with claim 8 wherein said *n*-phase generator derives *n* phase reference waves whose leading edges are controlled by said modulation frequency controlling pulses.

10. A power supply in accordance with claim 1 wherein said semiconductor chopper means includes a transistor having its emitter-collector circuit interposed between said undirectional source and said semiconductor switches, and wherein said carrier constant frequency is sufficiently high relative to said output frequency so that each said inverter output wave half cycle includes a plurality of carrier frequency variable time ratio pulses.

* * * * *